(12) United States Patent
Tsai et al.

(10) Patent No.: US 8,201,984 B2
(45) Date of Patent: Jun. 19, 2012

(54) BACKLIGHT MODULE

(75) Inventors: Han-Wen Tsai, Hsin-Chu (TW);
Jyh-Ming Chen, Hsin-Chu (TW);
Ping-Feng Hwang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 105 days.

(21) Appl. No.: 12/891,810

(22) Filed: Sep. 28, 2010

(65) Prior Publication Data
US 2011/0096566 A1    Apr. 28, 2011

(30) Foreign Application Priority Data

Oct. 28, 2009   (TW) .............................. 98136506 A

(51) Int. Cl.
*F21V 7/04*    (2006.01)
(52) U.S. Cl. ........ 362/607; 362/600; 362/601; 362/620; 349/62; 349/65
(58) Field of Classification Search .................. 362/660, 362/620, 606, 611, 331, 97.1
See application file for complete search history.

(56) References Cited

U.S. PATENT DOCUMENTS

| | | | |
|---|---|---|---|
| 6,091,547 A | 7/2000 | Gardiner et al. | |
| 7,282,272 B2 | 10/2007 | Jones et al. | |
| 7,798,696 B2 * | 9/2010 | Lee et al. | 362/612 |
| 2007/0047258 A1 * | 3/2007 | Yao et al. | 362/615 |
| 2008/0043172 A1 | 2/2008 | Kim et al. | |

OTHER PUBLICATIONS

Pei-Chun Lee, "The application of Anisotropic Silicon Etching and Electroforming to the Fabrication of Brightness Enhancement Films", http://www2.nkfust.edu.tw/~jcyu/WebsiteData/Website/CED_Lab/doc/CSME07_BEF_6P.pdf reference No. of D-17-0024 in the 24th National Conference on Mechanical Engineering of the Chinese Society of Mechanical Engineering, Nov. 23, 2007.

* cited by examiner

*Primary Examiner* — Ali Alavi
(74) *Attorney, Agent, or Firm* — Jianq Chyun IP Office

(57) ABSTRACT

A backlight module includes a light guide plate, micro-structures, at least one light source, and a first prism sheet. The light guide plate includes a first surface, a second surface, and a light incident surface connecting the first surface and the second surface. The micro-structures are disposed on at least one of the first surface and the second surface. The light source is disposed beside the light incident surface and capable of emitting a light beam. The first prism sheet includes a first transparent substrate and first prism structures. The first surface is located between the second surface and the first transparent substrate. The first transparent substrate is disposed among the first surface and the first prism structures. Each first prism structure has a first vertex angle protruding away from the first transparent substrate, and the first vertex angle falls within a range of 67 degrees to 83 degrees.

11 Claims, 6 Drawing Sheets

BACKLIGHT MODULE

CROSS-REFERENCE TO RELATED APPLICATION

This application claims the priority benefit of Taiwan application serial no. 98136506, filed on Oct. 28, 2009. The entirety of the above-mentioned patent application is hereby incorporated by reference herein and made a part of this specification.

BACKGROUND OF THE INVENTION

1. Field of the Invention

The invention relates to a light source, and more particularly to a backlight module.

2. Description of Related Art

With rapid progress in display techniques, the flat panel display has become the mainstream among various displays and replaced the cathode ray tube (CRT). Among various flat panel displays, the liquid crystal display (LCD) has been deeply favored by the consumers for usage. The LCD includes a liquid crystal panel and a backlight module. The LCD does not luminesce by itself, but is used to determine a light passing rate. Thus, a backlight module is disposed behind the liquid crystal panel as a surface light source of the same. The optical quality of the surface light source greatly affects the display quality of the LCD. For example, in order to enhance the brightness of the display image, the range of a light emitting angle of the surface light source has to be smaller.

In a conventional side-type backlight module, a bottom diffusion sheet, two prism sheets having prism columns interlacing each other, and a top diffusion sheet are disposed from the bottom to the top sequentially. The prism sheets are configured to reduce the range of the light emitting angle, and the top diffusion sheet and the bottom diffusion sheet are configured to uniform the light and prevent the contours of the prism columns and the liquid crystal panel from generating moiré with the LCD. However, the method of disposing four optical films on top of the light guide plate increases the cost of the backlight module. Also, too many optical films lead to assembly difficulty and poor reduction in thickness of the backlight module. Also, the adoption of up to four optical films causes light loss easily, so that the positive brightness of the backlight module is difficult to be further enhanced.

In U.S. Pat. No. 6,091,547, two light emitting control films each having a plurality of trigonal prisms is disclosed. In U.S. Patent Publication No. 20080043172, a backlight module having a light source, a first prism sheet, a second prism sheet, and a light guide plate is disclosed. The publication, entitled "the application of anisotropic silicon etching and electroforming to the fabrication of brightness enhancement films", with a reference number of D-17-0024 in the 24$^{th}$ National Conference on Mechanical Engineering of The Chinese Society of Mechanical Engineering disclosed a fabrication method of an optical brightness enhancement film and an optical feature thereof.

SUMMARY OF THE INVENTION

The invention is directed to a backlight module having small thickness and higher light efficiency.

Other purposes and advantages of the invention may be further understood by referring to the technical features broadly embodied and described as follows.

In order to achieve at least one of the above advantages or other advantages, an embodiment of the invention provides a backlight module including a light guide plate, a plurality of micro-structures, at least one light source, and a first prism sheet. The light guide plate has a first surface, a second surface opposite to the first surface, and a light incident surface connecting the first surface and the second surface. The micro-structures are disposed on at least one of the first surface and the second surface. A size of each of the micro-structures is smaller than or equal to 150 micrometers (μm). The light source is disposed beside the light incident surface and capable of emitting a light beam. The light incident surface is capable of guiding the light beam into the light guide plate. The first surface is capable of guiding the light beam away from the light guide plate. The first prism sheet includes a first transparent substrate and a plurality of first prism structures. The first surface is located between the second surface and the first transparent substrate. The first transparent substrate is disposed between the first surface and the first prism structures. Each of the first prism structures has a first vertex angle protruding away from the first transparent substrate, and the first vertex angle falls within a range of 67 degrees to 83 degrees.

In the embodiments of the invention, since the size of each micro-structure is smaller than or equal to 150 μm and the vertex angle of each first prism structure falls within the range of 67 degrees to 83 degrees, the backlight module of the embodiment is capable of enhancing the light efficiency and providing a uniform surface light source.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
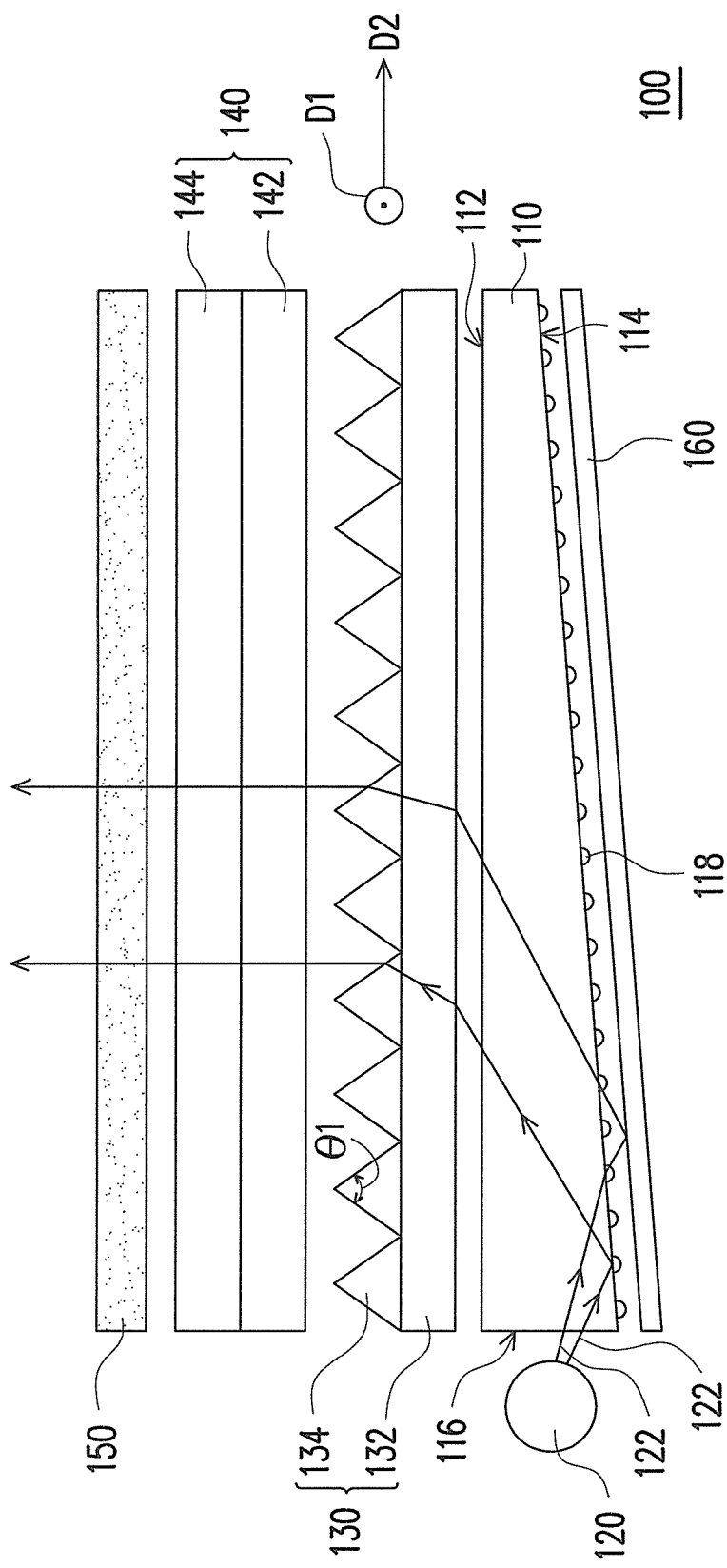
FIGS. 1A and 1B illustrate schematic cross-sectional views of a backlight module along two different directions according to one embodiment of the invention.
Figure 1B:
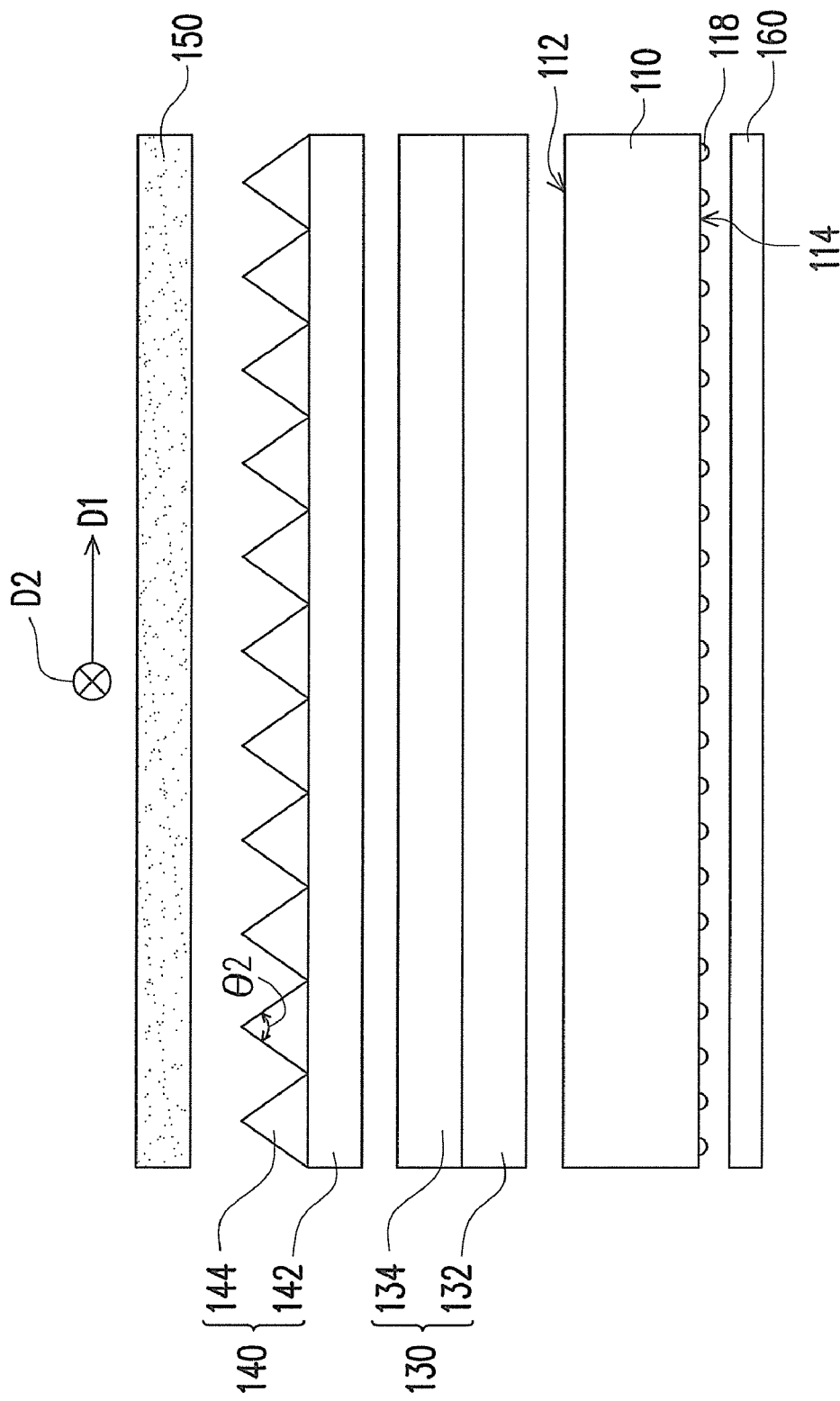
Figure 2:
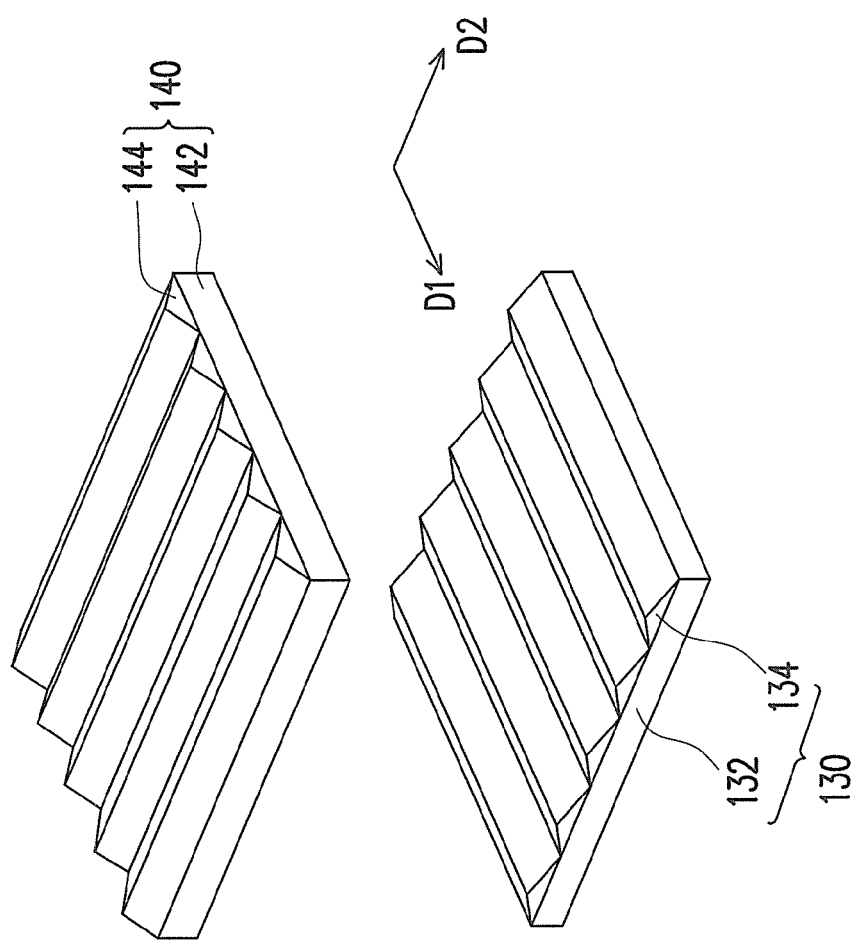
FIG. 2 illustrates a three-dimensional schematic view of the first prism sheet and the second prism sheet of the backlight module in FIG. 1A.

Referring to FIGS. 1A, 1B, and 2, a backlight module 100 of the embodiment includes a light guide plate 110, a plurality of micro-structures 118, at least one light source 120, and a first prism sheet 130. The light guide plate 110 has a first surface 112, a second surface 114 opposite to the first surface 112, and a light incident surface 116 connecting the first surface 112 and the second surface 114. The micro-structures 118 are disposed on at least one of the first surface 112 and the second surface 114. In the embodiment, the micro-structures 118 are disposed on the second surface 114. Moreover, in the embodiment, the micro-structures 118 are, for example, protrusions. In other embodiments, however, the micro-structures 118 are recessions, light scattering particles, or any combination of the protrusions, the recessions, and the light scattering particles. A size of each micro-structure 118 is smaller than or equal to 150 micrometers (μm), for example, a diameter of each micro-structure 118 is smaller than or equal to 150 μm.

The light source 120 is disposed beside the light incident surface 116 and capable of emitting a light beam 122. In the embodiment, the light source 120, for example, is a cold cathode fluorescent lamp (CCFL). However, in other embodiments, the light sources 120 are plural, and the CCFL is replaced with a plurality of light emitting diodes (LEDs), for instance. In addition, in the embodiment, the light source 120 is disposed at one side of the light guide plate 110. In other embodiments, however, two or more light sources 120 are disposed on two opposite sides of the light guide plate 110.

The light incident surface 116 is capable of guiding the light beam 122 into the light guide plate 110. The first surface 112 is capable of guiding the light beam 122 away from the light guide plate 110. Specifically, after entering the light guide plate 110 via the light incident surface 116, the light beam 122 is total internally reflected many times by the first surface 112 and the second surface 114, and therefore limited within the light guide plate 110. However, the micro-structures 118 scatter the light beam 122 to destroy the total internal reflection. After being scattered by the micro-structures 118, a portion of the light beam 122 passes through the first surface 112 to emit from the light guide plate 110. Also, after being scattered by the micro-structures 118, another portion of the light beam 122 emits to a reflective unit 160 disposed at one side of the second surface 114 via the second surface 114. The reflective unit 160 is, for example, a reflector capable of reflecting the light beam 122, so that the reflected light beam 122 passes through the second surface 114 and the first surface 112 sequentially to emit from the light guide plate 110.

The first prism sheet 130 includes a first transparent substrate 132 and a plurality of first prism structures 134. The first transparent substrate 132 and the first prism structures 134 are all made of transparent materials, for example. The first surface 112 is located between the second surface 114 and the first transparent substrate 132. The first transparent substrate 132 is disposed between the first surface 112 and the first prism structures 134. Each of the first prism structures 134 has a first vertex angle θ1 protruding away from the first transparent substrate 132, and the first vertex angle θ1 falls within a range of 67 degrees to 83 degrees.

In the embodiment, each of the first prism structures 134 extends along a first direction D1 substantially parallel to the first transparent substrate 132. The first prism structures 134 align along a second direction D2 substantially parallel to the first transparent substrate 132. The first direction D1 is substantially perpendicular to the second direction D2. In the embodiment, each of the first prism structures 134 is a trigonal prism, for instance. The light beam 122 emitting from the light guide plate 110 via the first surface 112 then transmits to the first prism sheet 130. The first prism structures 134 reduce the light emitting angle of the light beam 122 in the second direction D2, so as to enhance the positive brightness (that is, the brightness in a direction perpendicular to the first surface 112) of the light beam 122.

In the embodiment, the backlight module 100 further includes a second prism sheet 140 disposed on the first prism sheet 130. The second prism sheet 140 includes a second transparent substrate 142 and a plurality of second prism structures 144. The second transparent substrate 142 is disposed between each of the first prism structures 134 and each of the second prism structures 144. In the embodiment, each of the second prism structures 144 has a second vertex angle θ2 protruding away from the second transparent substrate 142, and the second vertex angle θ2 falls within a range of 67 degrees to 83 degrees. Each of the second prism structures 144 extends along the second direction D2. The second prism structures 144 are aligned along the first direction D1. In other words, an extending direction of the second prism structures 144 is substantially perpendicular to an extending direction of the first prism structures 134. Additionally, the second prism structures 144 are trigonal prisms. In the embodiment, the second prism structures 144 and the second transparent substrate 142 are all made of transparent materials, for instance. The light beam 122 passing through the first prism sheet 130 then transmits to the second prism sheet 140. The second prism structures 144 reduce the light emitting angle of the light beam 122 in the first direction D1, so as to enhance the positive brightness of the light beam 122.

In the embodiment, the backlight module 100 further includes a diffusion sheet 150. Herein, the first prism sheet 130 is disposed between the light guide plate 110 and the diffusion sheet 150. Furthermore, in the embodiment, the second prism sheet 140 is disposed between the first prism sheet 130 and the diffusion sheet 150. The diffusion sheet 150 enhances the uniformity of the light beam 122, such that the surface light source provided by the backlight module 100 has superior uniformity. In the embodiment, no diffusion sheet is disposed between the light guide plate 110 and the first prism sheet 130.

In the backlight module 100 of the embodiment, since the size of the micro-structures 118 is smaller than or equal to 150 μm, the backlight module 100 only needs to adopt one diffusion sheet 150 to prevent a user from recognizing the micro-structures 118. The foregoing is one of the reasons for not disposing a diffusion sheet between the light guide plate 110 and the first prism sheet 130 in the backlight module 100 of the embodiment. Moreover, as the first vertex angle θ1 of each first prism structure 134 falls within the range of 67 degrees to 83 degrees, this range of the first vertex angle θ1 is particularly suitable for guiding the light beam 122 emitting from the light guide plate 110 and not yet passing through the diffusion sheet 150 (that is the light beam 122 emits in a direction perpendicular to the first surface 112). The foregoing is one of the reasons that the positive brightness of the light beam 122 may be enhanced without a diffusion sheet being disposed between the light guide plate 110 and the first prism sheet 130 in the backlight module 100. Accordingly, the backlight module 100 of the embodiment provides a surface light source with higher uniformity and higher positive brightness. Since the backlight module 100 does not require a diffusion sheet disposed between the light guide plate 110 and the first prism sheet 130, the thickness thereof may be thinned. As the adoption of another diffusion sheet is omitted, the light efficiency of the backlight module 100 is higher, such that the positive brightness of the surface light source is enhanced.

Alternatively, in a backlight module adopting a V-trench design on a second surface of a light guide plate and adopting a matte design on a first surface, the non-uniform surface light source is caused by deficiency of V-trenches and the light emitting uniformity is hard to be controlled through the difference of roughness in the matte design. However, the backlight module 100 of the embodiment adopts a distribution design of the micro-structures 118 on the light guide plate 110, so that the light uniformity may be controlled easily (i.e. through adjusting the density and size of the micro-structures 118 in different regions). In other embodiments, the micro-structures 118, for example, are fabricated using an ink jet technique. A size of the micro-structures 118 is controlled to be smaller than or equal to 150 μm, such that the user may not recognize the micro-structures 118 when a thin light guide plate 110 is used. Therefore, the backlight module 100 of the embodiment has lower costs and a thinned light guide plate, but is still capable of achieving superior optical effect.

In the following, a diagram showing optical data of two backlight modules is provided to verify the function of the backlight module 100 in the embodiment.

Figure 3A:
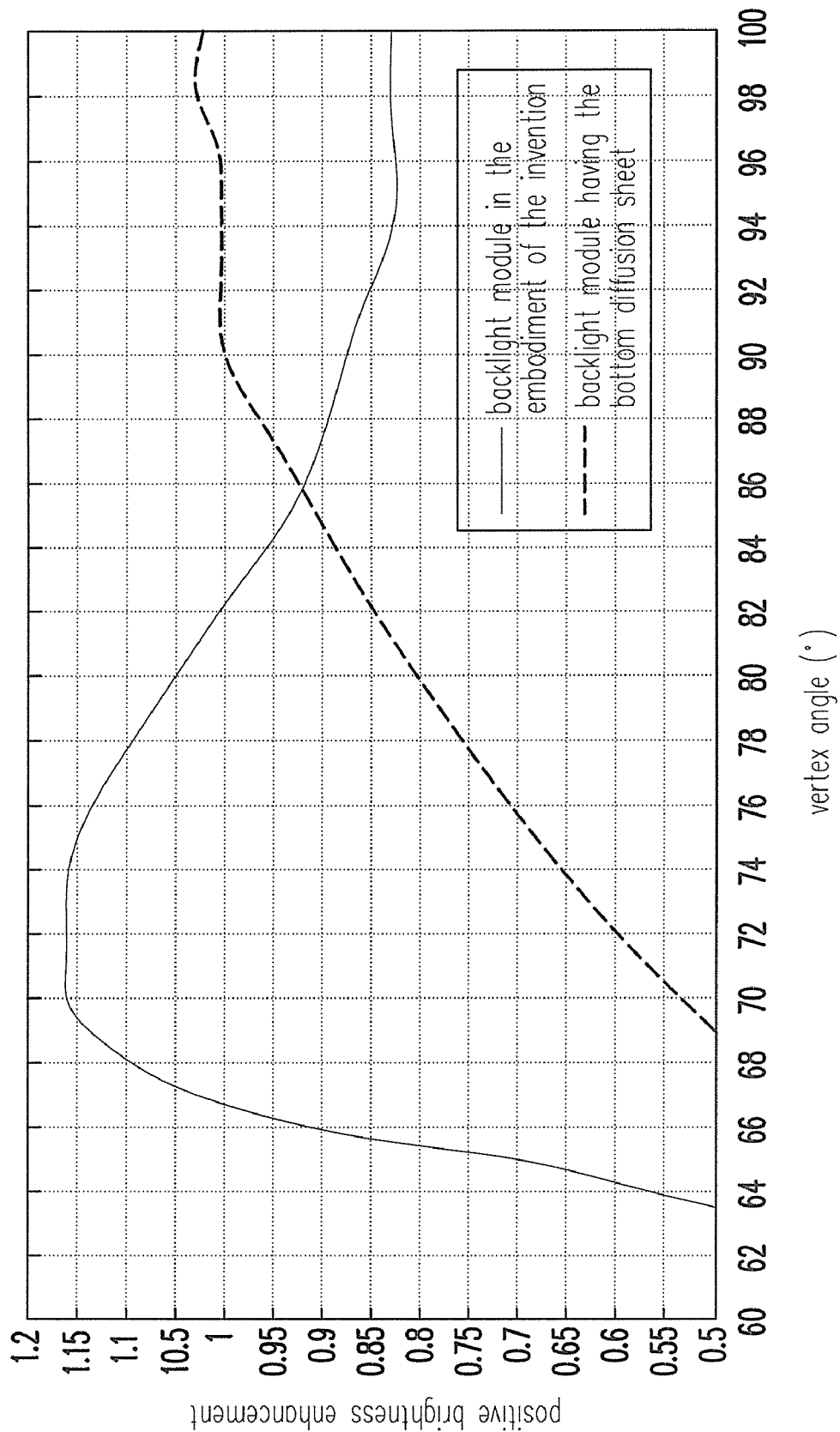
FIG. 3A is a curve diagram showing a relationship of positive brightness enhancement versus size of a vertex angle of a prism structure of the backlight module in FIG. 1A and a backlight module having a bottom diffusion sheet.

Referring to FIG. 3A, the bottom diffusion sheet is a diffusion sheet disposed between the light guide plate 110 and the first prism sheet 130. As illustrated in FIG. 3A, when the backlight module adopts the bottom diffusion sheet, the vertex angle of the prism structure is larger than 90° and a higher positive brightness may be attained. At this time, the positive brightness enhancement value is defined as 1. In comparison, the embodiment adopts the backlight module 100 omitting the bottom diffusion sheet, such that when the first vertex angle θ1 ranges within 67 degrees to 83 degrees, the positive brightness is higher than 1. In addition, when the first vertex angle θ1 ranges within 69 degrees to 75 degrees, the positive brightness is higher than 1.15. The backlight module 100 of the embodiment is capable of providing a surface light source with higher positive brightness. Moreover, the first vertex angle θ1 ranging within 67 degrees to 83 degrees is adapted for a condition without adopting the bottom diffusion sheet.

Figure 3B:
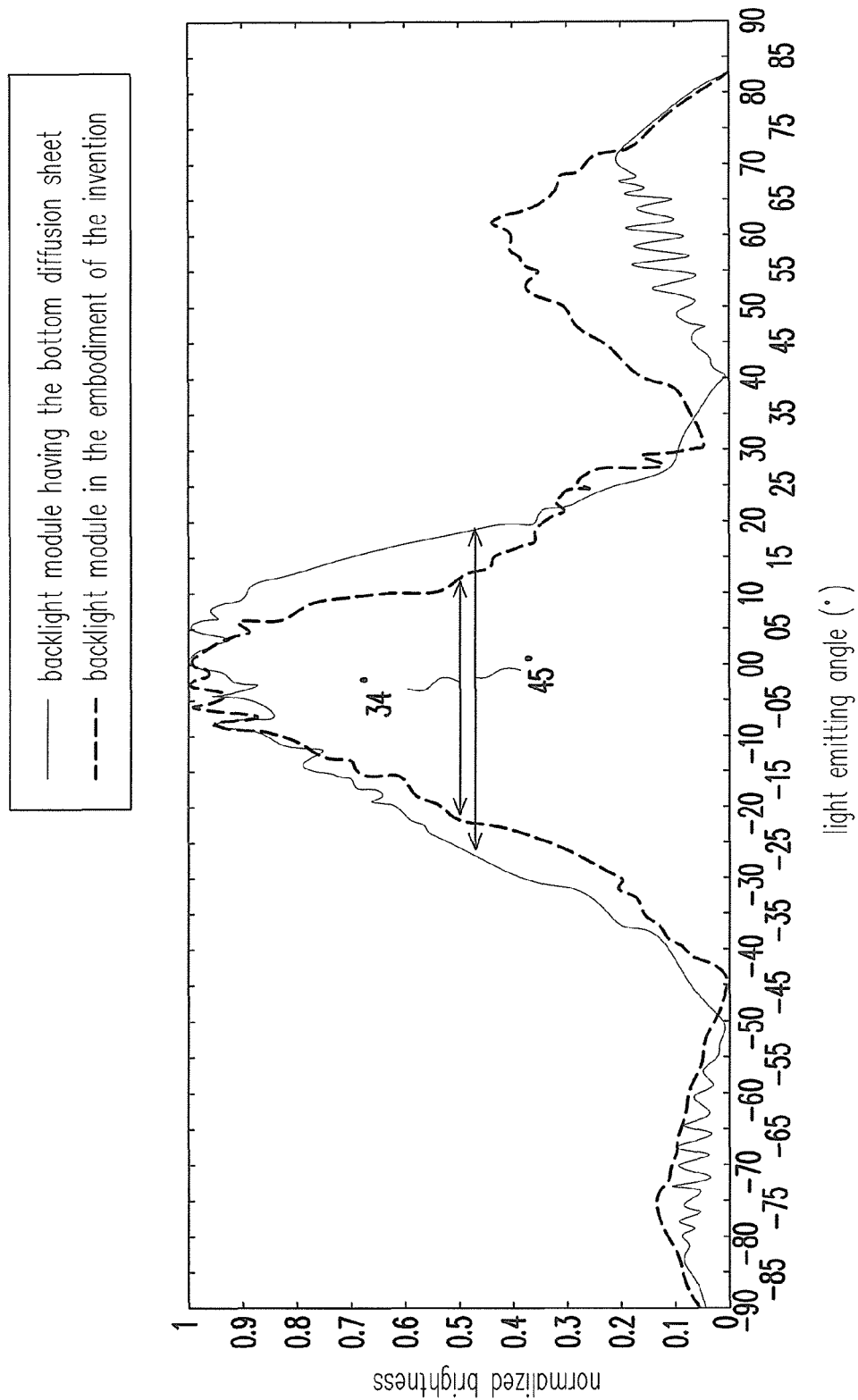
FIG. 3B is a distribution diagram showing normalized brightness relative to emitting angle of the backlight module in FIG. 1A and a backlight module having a bottom diffusion sheet.

Referring to FIG. 3B, as shown herein, the range of a light emitting angle of the backlight module having the bottom diffusion sheet is about 45 degrees and a light emitting angle of the backlight module 110 of the embodiment is about 34 degrees. In other words, the backlight module 110 of the embodiment reduces the light emitting angle of the light beam 122, thereby enhancing the positive brightness of the surface light source effectively.

Figure 4:
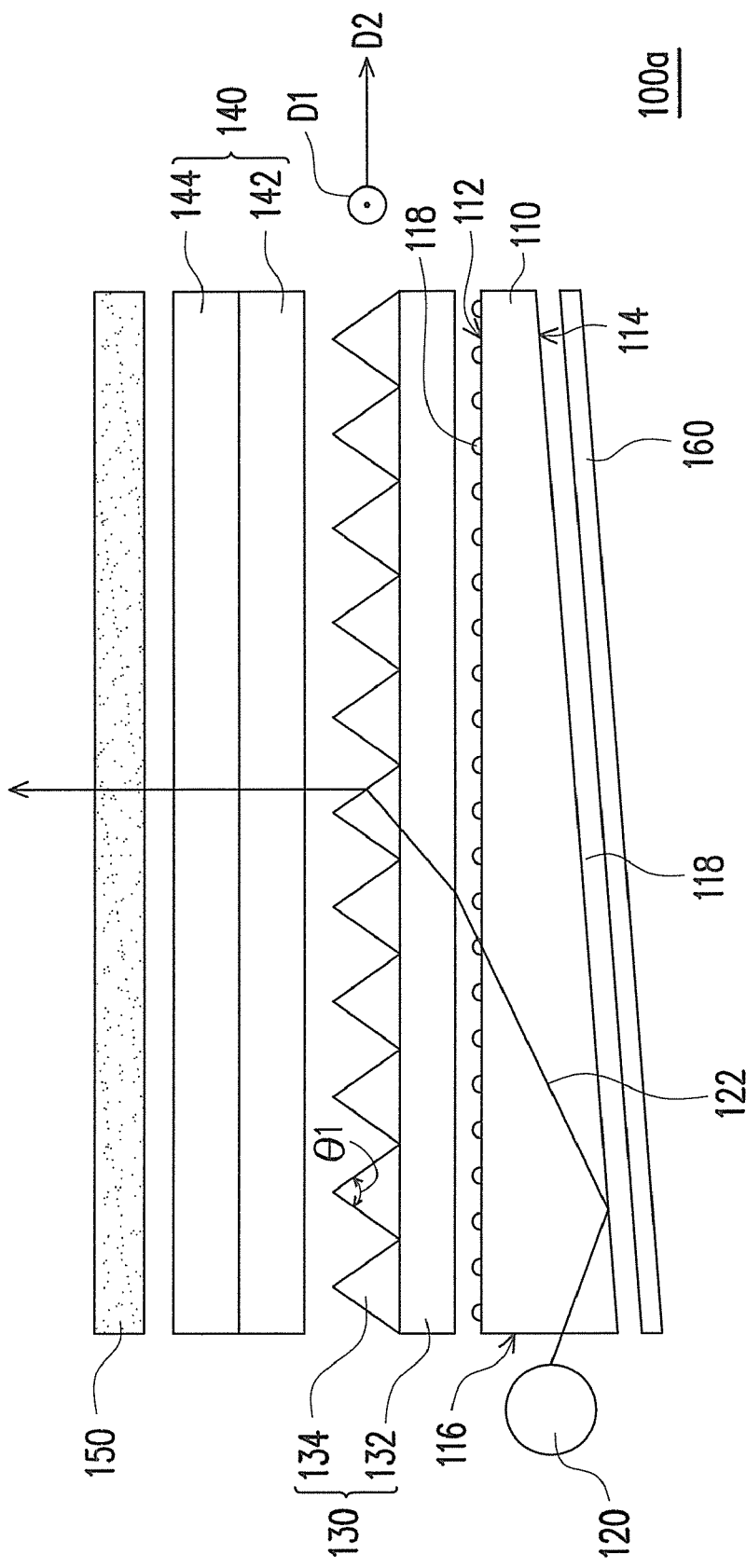
FIG. 4 illustrates a schematic cross-sectional view of a backlight module according to another embodiment of the invention.

Referring to FIG. 4, a backlight module 100a of the embodiment is similar to the backlight module 100 in FIG. 1A. The main difference therebetween is that a plurality of micro-structures 118 of the backlight module 100a of the embodiment is disposed on the first surface 112 of the light guide plate 110. In the embodiment, the micro-structures 118 similarly destroy the total internal reflection effect, such that the light beam 122 transmits to the first prism sheet 130. The advantages and functions of the backlight module 100a of the embodiment are similar to those of the backlight module 100 in FIG. 1A, and are not repeated herein.

In other embodiments, the micro-structures 118 may be present on the first surface 112 and the second surface 114 of the light guide plate 110 simultaneously depending on actual demands of the user.

In summary, the embodiment or embodiments of the invention may have at least one of the following advantages: in the embodiments of the invention, since the size of each micro-structure is smaller than or equal to 150 μm and the vertex angle of each first prism structure falls within the range of 67 degrees to 83 degrees, the backlight module of the embodiment is capable of enhancing the light efficiency and providing a uniform surface light source.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising:
    a light guide plate, having a first surface, a second surface opposite to the first surface, and a light incident surface connecting the first surface and the second surface;
    a plurality of micro-structures, disposed on at least one of the first surface and the second surface, wherein a size of each of the micro-structures is smaller than or equal to 150 micrometers;
    at least one light source, disposed beside the light incident surface, wherein the light source is capable of emitting a light beam, the light incident surface is capable of guiding the light beam into the light guide plate, and the first surface is capable of guiding the light beam away from the light guide plate; and
    a first prism sheet, comprising:
        a first transparent substrate, wherein the first surface is located between the second surface and the first transparent substrate; and
        a plurality of first prism structures, wherein the first transparent substrate is disposed between the first surface and the first prism structures, and each of the first prism structures has a first vertex angle protruding away from the first transparent substrate and ranging within a range of 67 degrees to 83 degrees.

2. The backlight module as claimed in claim 1, wherein no diffusion sheet is disposed between the light guide plate and the first prism sheet.

3. The backlight module as claimed in claim 1, wherein the micro-structures comprise at least one of protrusions, recessions, light scattering particles, and combination thereof.

4. The backlight module as claimed in claim 1, wherein each of the first prism structures extends along a first direction substantially parallel to the first transparent substrate, the first prism structures align along a second direction substantially parallel to the first transparent substrate, and the first direction is substantially perpendicular to the second direction.

5. The backlight module as claimed in claim 4, wherein each of the first prism structures is a trigonal prism.

6. The backlight module as claimed in claim 1, further comprising a second prism sheet disposed on the first prism sheet, the second prism sheet comprising:
    a second transparent substrate; and
    a plurality of second prism structures, wherein the second transparent substrate is disposed between each of the first prism structures and each of the second prism structures.

7. The backlight module as claimed in claim 6, wherein each of the second prism structures has a second vertex angle protruding away from the second transparent substrate and ranging within a range of 67 degrees to 83 degrees.

8. The backlight module as claimed in claim 6, wherein each of the first prism structures extends along a first direction substantially parallel to the first transparent substrate, the first prism structures align along a second direction substantially parallel to the first transparent substrate, each of the second prism structures extends along the second direction, the second prism structures align along the first direction, and the first direction is substantially perpendicular to the second direction.

9. The backlight module as claimed in claim 8, wherein the first prism structures and the second prism structures are all trigonal prisms.

10. The backlight module as claimed in claim 1, further comprising a diffusion sheet, wherein the first prism sheet is disposed between the light guide plate and the diffusion sheet.

11. The backlight module as claimed in claim 1, further comprising a reflective unit disposed at one side of the second surface.

* * * * *